United States Patent
Sugiura

(10) Patent No.: US 9,786,907 B2
(45) Date of Patent: Oct. 10, 2017

(54) POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

(71) Applicant: TOYOTA JIDOSHA KABUSHIKI KAISHA, Toyota-shi, Aichi-ken (JP)

(72) Inventor: Ryuta Sugiura, Toyohashi (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 109 days.

(21) Appl. No.: 14/805,756

(22) Filed: Jul. 22, 2015

(65) Prior Publication Data
US 2016/0028074 A1    Jan. 28, 2016

(30) Foreign Application Priority Data
Jul. 22, 2014  (JP) ................. 2014-149290

(51) Int. Cl.
*H01M 4/131*  (2010.01)
*H01M 4/36*  (2006.01)
(Continued)

(52) U.S. Cl.
CPC ......... *H01M 4/364* (2013.01); *H01M 4/1315* (2013.01); *H01M 4/505* (2013.01); *H01M 4/525* (2013.01); *H01M 10/052* (2013.01)

(58) Field of Classification Search
CPC .... H01M 4/364; H01M 4/1315; H01M 4/525; H01M 4/505; H01M 10/052
See application file for complete search history.

(56) References Cited

U.S. PATENT DOCUMENTS 6,337,158 B1    1/2002  Nakajima et al.
2001/0024754 A1  9/2001  Fukuzawa et al.
(Continued)

FOREIGN PATENT DOCUMENTS

CN    103107327 A        5/2013
CN    103682289    *    3/2014    ........... H01M 4/505
(Continued)

OTHER PUBLICATIONS

Shin et. al, (Effect of fluorine on the electrochemical properties of layered Li[Ni0.43Co0.22Mn0.35]O2 cathode materials via a carbonate process, Electrical and Solid-State Letters, 8 (11), A559-A563 (2005).*
(Continued)

*Primary Examiner* — Cynthia K Walls
(74) *Attorney, Agent, or Firm* — Sughrue Mion, PLLC

(57) ABSTRACT

A positive electrode active material for a lithium secondary battery includes a primary particle containing a spinel phase and a layered rock-salt phase. The spinel phase is formed of a nickel-and-manganese-containing composite oxide having a spinel crystal structure that includes lithium, nickel, and manganese. The layered rock-salt phase is formed of a transition metal composite oxide having a layered rock-salt crystal structure that includes lithium and at least one transition metal element. The nickel-and-manganese-containing composite oxide contains oxygen and fluorine. The transition metal composite oxide includes oxygen and fluorine.

10 Claims, 1 Drawing Sheet

(51) Int. Cl.
*H01M 4/525* (2010.01)
*H01M 4/505* (2010.01)
*H01M 4/1315* (2010.01)
*H01M 10/052* (2010.01)

(56) References Cited

U.S. PATENT DOCUMENTS

| | | | |
|---|---|---|---|
| 2003/0086863 | A1 | 5/2003 | Noguchi et al. |
| 2006/0057466 | A1 | 3/2006 | Suhara et al. |
| 2012/0315544 | A1 | 12/2012 | Yasuda et al. |
| 2015/0089797 | A1* | 4/2015 | Binder .......... C01G 45/1242 29/623.1 |

FOREIGN PATENT DOCUMENTS

| | | |
|---|---|---|
| JP | 2000149925 A | 5/2000 |
| JP | 2001250549 A | 9/2001 |
| JP | 2002184402 A | 6/2002 |
| JP | 2003197194 A | 7/2003 |
| JP | 3634694 B2 | 3/2005 |
| JP | 2006202678 A | 8/2006 |
| JP | 2010-511990 A | 4/2010 |
| JP | 2012181975 A | 9/2012 |
| JP | 2014-130773 A | 7/2014 |
| WO | 2005028371 A1 | 3/2005 |
| WO | 2008/069351 A1 | 6/2008 |
| WO | 2011111364 A1 | 9/2011 |
| WO | 2013149716 A1 | 10/2013 |
| WO | WO 2013/149716 * 10/2013 .......... H01M 4/1315 |

OTHER PUBLICATIONS

Machine translation of CN 103682289, retrieved from <https://worldwide.espacenet.com/?locale=EN_ep> on Dec. 30, 2016.*
Du et al., "Fluorine-doped LiNi0.5Mn1.5O4 for 5 V cathode materials of lithium-ion battery", Materials Research Bulletin, 2008, vol. 43, Issue 12, pp. 3607-3613.
Park, S.-H. et al., "Lithium-manganese-nickel-oxide electrodes with integrated layered-spinel structures for lithium batteries", Electrochemistry Communications, 2007, vol. 9, pp. 262-268.
Wang, Z.Q. et al., "Polaron states and migration in F-doped $Li_2MnO_3$", Physics Letters A, 2014, vol. 378, pp. 2449-2452.

* cited by examiner

POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

INCORPORATION BY REFERENCE

The disclosure of Japanese Patent Application No. 2014-149290 filed on Jul. 22, 2014 including the specification, drawings and abstract is incorporated herein by reference in its entirety.

BACKGROUND OF THE INVENTION

1. Field of the Invention

The present invention relates to a positive electrode active material for a lithium secondary battery, a positive electrode for a lithium secondary battery, and a lithium secondary battery.

2. Description of Related Art

In an effort to improve the performance of a lithium secondary battery in which lithium ions are used as charge carriers, it is required to further increase energy density. In order to satisfy such requirements, the development of a positive electrode active material (high-potential positive electrode active material) having a high action potential has progressed. Examples of such a positive electrode active material include a nickel-and-manganese-containing composite oxide (hereinafter, also referred to as "Ni—Mn spinel-structure oxide"). The Ni—Mn spinel-structure oxide exhibits an action potential of 4.3 V or higher (preferably, an action potential of 4.5 V or higher) vs. lithium metal and is a lithium transition metal composite oxide having a spinel crystal structure. For example, Japanese Patent No. 3634694 and Japanese Patent Application Publication No. 2003-197194 (JP 2003-197194 A) discloses examples of the Ni—Mn spinel-structure oxide. In addition, Japanese Patent Application Publication No. 2001-250549 (JP 2001-250549 A) discloses a lithium-containing manganese layered composite oxide in which a part of oxygen atoms (O) is substituted with fluorine atoms (F). In addition, Materials Research Bulletin, 2008, Vol. 43, Issue 12, pp. 3607-3613 discloses a Ni—Mn spinel-structure oxide in which a part of O is substituted with F.

When the Ni—Mn spinel-structure oxide is used as a high-potential positive electrode active material for a lithium secondary battery to further improve performance, one of the objects is, for example, improvement of durability during the use of a lithium secondary battery at a high potential. For example, in a case where this Ni—Mn spinel-structure oxide is used as a high-potential positive electrode active material, when a battery is repeatedly charged and discharged under a condition of being charged such that a positive electrode has a high potential of 4.3 V or higher vs. lithium metal, the battery capacity tends to decrease (deteriorate) along with an increase in the number of times of charging and discharging. One of the reasons is considered to be that, in the high-potential charging state, a transition metal element (for example, manganese) contained in the Ni—Mn spinel-structure oxide is likely to be eluted. In addition, in the high-potential charging state, a nonaqueous electrolyte (typically, a nonaqueous electrolytic solution) is decomposed to produce an additional acid (for example, hydrogen fluoride (HF)). Thus, the elution of a transition metal element from the Ni—Mn spinel-structure oxide may be promoted due to the additional acid. Further, when the temperature of a battery increases (for example, 60° C. or higher) by repeated high-potential charging and discharging, the amount of lithium (Li) deactivated on the surface of a negative electrode may increase. The deviated lithium is unavailable for charge and discharge. As a result, the amount of Li in a positive electrode active material may decrease to cause a deterioration in capacity (that is, a decrease in cycle characteristics).

SUMMARY OF THE INVENTION

The present invention provides a positive electrode active material for a lithium secondary battery, a positive electrode for a lithium secondary battery, and a lithium secondary battery.

A positive electrode active material for a lithium secondary battery according to a first aspect of the invention includes a primary particle including a spinel phase and a layered rock-salt phase. The spinel phase is formed of a nickel-and-manganese-containing composite oxide having a spinel crystal structure that includes lithium, nickel, and manganese. The layered rock-salt phase is formed of a transition metal composite oxide having a layered rock-salt crystal structure that includes lithium and at least one transition metal element. The nickel-and-manganese-containing composite oxide contains oxygen and fluorine. The transition metal composite oxide includes oxygen and fluorine.

Under a high-potential charging condition, oxygen (O) may be desorbed from the nickel-and-manganese-containing composite oxide having a spinel crystal structure (hereinafter, also referred to as "Ni—Mn spinel-structure oxide), and a part of the nonaqueous electrolyte may be oxidized and decomposed to produce an acid (for example, HF). Even in this case, the transition metal composite oxide constituting the layered rock-salt phase efficiently absorbs the acid in the first aspect of the invention. As a result, the elution of the transition metal (in particular, Mn) from the Ni—Mn spinel-structure oxide can be suppressed. In addition, when the temperature of a battery increases (for example, 60° C. or higher), the amount of lithium (Li) deactivated on the surface of a negative electrode may increase, and thus the amount of Li in the Ni—Mn spinel-structure oxide may decrease. Even in this state, Li is supplied from the transition metal composite oxide constituting the layered rock-salt phase in the first aspect of the invention, and a deterioration (decrease) in capacity can be suppressed. Therefore, the first aspect of the invention can suppress a deterioration (decrease) in battery capacity even when a battery is repeatedly charged and discharged under a condition of being charged such that a positive electrode has a high potential of 4.3 V or higher (or 4.5 V or higher) vs. lithium metal.

In the first aspect of the invention, the nickel-and-manganese-containing composite oxide contains a fluorine atom (F) having high electronegativity (electron attracting properties). This F is bonded to a metal element such as Mn in the Ni—Mn spinel-structure oxide with high bonding strength. Therefore, even in the above high-potential charging state, the elution of the transition metal such as Mn from the Ni—Mn spinel-structure oxide can be more efficiently suppressed. In addition, the transition metal composite oxide constituting the layered rock-salt phase includes a fluorine atom (F). This F is bonded to the transition metal (for example, Mn) in the transition metal composite oxide constituting the layered rock-salt phase with high bonding strength. Thus, the oxidation resistance performance of the transition metal composite oxide can be improved. Therefore, the supply of Li to the Ni—Mn spinel-structure oxide can be stably continued over a long period of time, and the durability (cycle characteristics) of the entire positive electrode active material can be improved.

As described above, by using the positive electrode active material having this configuration, a deterioration in the capacity of the positive electrode active material can be suppressed even under a high-potential condition. According to a lithium secondary battery constructed using the positive electrode active material, when being used under a condition of being charged such that a positive electrode has a high potential of 4.3 V or higher (or 4.5 V or higher) vs. lithium metal, the durability (cycle characteristics) of the entire positive electrode active material can be improved.

In the first aspect of the invention, the fluorine constituting the nickel-and-manganese-containing composite oxide may be fluorine substituted with a part of the oxygen constituting the nickel-and-manganese-containing composite oxide. The fluorine constituting the transition metal composite oxide may be fluorine substituted with a part of the oxygen constituting the transition metal composite oxide.

In the first aspect of the invention, the nickel-and-manganese-containing composite oxide may be represented by the following Formula (I):

$$LiMn_{2-x-y}Ni_xM_yO_{4-z}F_z \quad (I)$$

M represents at least one element selected from the group consisting of Fe, Ti, Al, Si, Mg, Ca, Ba, Sr, Sc, V, Cr, Co, Cu, Zn, Ga, Y, Ru, Rh, Pd, In, Sn, Sb, La, Ce, Sm, Zr, Nb, Ta, Mo, W, B, C, P, and S. The "x," "y," and "z" satisfy the following relationships:

$0<z\leq1;$ $0.4\leq x\leq0.6;$ and $0\leq y\leq0.6.$

According to this configuration, the spinel crystal structure can be stably maintained, and the effects of the first aspect of the invention can be exhibited more effectively. Therefore, this configuration can suppress the elution of the transition metal such as Mn, and provide a high-potential positive electrode active material having high durability.

In the above configuration, M may represent two or more elements selected from the group consisting of Fe, Ti, Al, Si, Mg, Ca, Ba, Sr, Sc, V, Cr, Co, Cu, Zn, Ga, Y, Ru, Rh, Pd, In, Sn, Sb, La, Ce, Sm, Zr, Nb, Ta, Mo, W, B, C, P, and S.

In the above configuration, the nickel-and-manganese-containing composite oxide may be represented by the following Formula (IA):

$$LiMn_{2-x-y}Ni_xFe_vTi_wO_{4-z}F_z \quad (IA)$$

The "v," and "w" satisfy the following relationships:

$0<v<0.6;$ $0<w<0.6;$ and $v+w=y.$

In the above configuration, the nickel-and-manganese-containing composite oxide may include at least one of Fe and Ti as M.

A part of Ni and Mn which are major transition metals constituting the spinel crystal structure is substituted with Ti and Fe. As a result, a bonding strength (bonding energy) between the transition metal in the Ni—Mn spinel-structure oxide and oxygen or fluorine can be further increased. Therefore, in a state where a battery is charged such that a positive electrode has a high potential of 4.3 V or higher vs. lithium metal, the stability (durability) of the Ni—Mn spinel-structure oxide can be further improved. In addition, oxygen desorption from the Ni—Mn spinel-structure oxide can be suppressed, and the oxidation decomposition of the nonaqueous electrolyte and the production of an acid (for example, HF) can be suppressed.

In the first aspect of the invention, the transition metal composite oxide may be represented by the following Formula (II):

$$Li_{(2-a)}M1_{(1+a)}O_{3-b}F_b \quad (II)$$

M1 represents manganese or at least two elements including manganese. The "a" and "b" satisfy the following relationships:

$0<b\leq1;$ and $0\leq a\leq0.5.$

As described above, the transition metal composite oxide including an excess amount of Li is preferable because the transition metal composite oxide is superior in the absorption of an acid. When the temperature of a lithium secondary battery increases (for example, 60° C. or higher), the amount of Li in the Ni—Mn spinel-structure oxide decreases. In this state where the amount of Li decreases, the transition metal composite oxide including an excess amount of Li has a superior Li supply ability. Therefore, the above configuration can suppress a deterioration (decrease) in the capacity of the entire positive electrode active material efficiently and provide a high-potential positive electrode active material having high durability.

In the first aspect of the invention, the primary particle of the nickel-and-manganese-containing composite oxide may have no grain boundary.

Typically, in the above configuration, the absence of a grain boundary can be verified using a transmission electron microscope (TEM). In the positive electrode active material having the above configuration, the nickel-and-manganese-containing composite oxide constituting the spinel phase is bonded to the transition metal composite oxide constituting the layered rock-salt phase through oxygen so as to constitute integrated primary particles. Therefore, according to the above configuration, the contact area of the transition metal composite oxide constituting the layered rock-salt phase with the nonaqueous electrolyte is limited. As a result, during the above production of an acid (for example, HF), deterioration of the transition metal composite oxide constituting the layered rock-salt phase caused by the acid can be suppressed. In addition, due to the stable Li supply from the transition metal composite oxide in which the deterioration is suppressed, a deterioration (decrease) in the capacity of the Ni—Mn spinel-structure oxide can be efficiently suppressed.

In the first aspect of the invention, a ratio of the transition metal composite oxide may be 3 mol % to 8 mol % with respect to 100 mol % of a total amount of the transition metal composite oxide and the nickel-and-manganese-containing composite oxide.

The positive electrode active material having the above configuration has a sufficient amount of the Ni—Mn spinel-structure oxide and thus is preferable as a high-potential positive electrode active material. In addition, the positive electrode active material having the above configuration has a sufficient amount of the transition metal composite oxide. Even in a state where the amount of Li in the Ni—Mn spinel-structure oxide decreases, Li is supplied from the transition metal composite oxide constituting the layered rock-salt phase. Therefore, according to the above configuration, a deterioration (decrease) in the capacity of the Ni—Mn spinel-structure oxide can be efficiently suppressed.

A second aspect of the invention is a positive electrode for a lithium secondary battery. The positive electrode includes a positive electrode active material layer that is provided on a positive electrode current collector and includes the positive electrode active material according to the first aspect of the invention.

A lithium secondary battery according to a third aspect of the invention includes a positive electrode, a negative electrode, and a nonaqueous electrolyte. The positive electrode includes a positive electrode active material layer provided on a positive electrode current collector. The negative electrode includes a negative electrode active material layer provided on a negative electrode current collector. The positive electrode active material layer includes the positive electrode active material according to the first aspect of the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
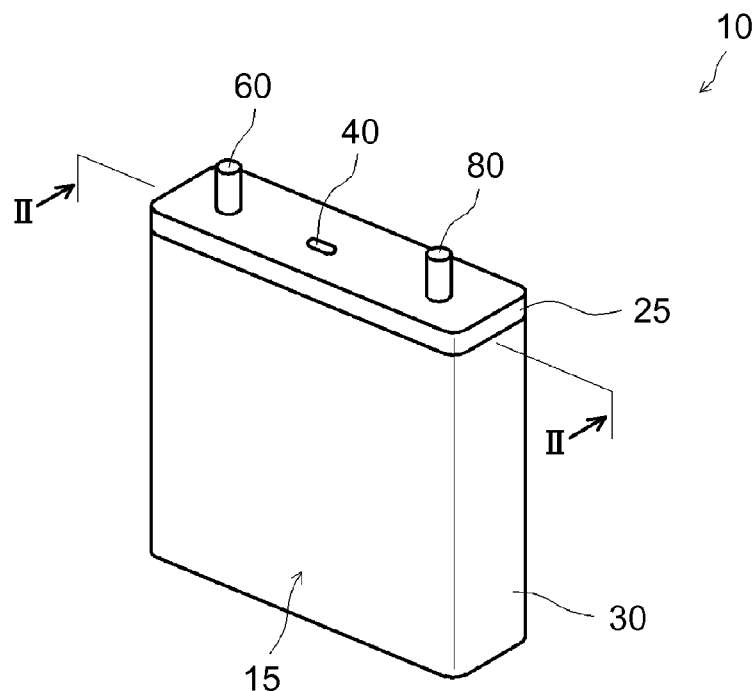
FIG. 1 is a perspective view schematically showing the external appearance of a lithium secondary battery according to an embodiment of the invention.

Preferred embodiments of the invention are described below. Matters necessary to implement the embodiments of the invention other than those specifically referred to in this description may be understood as design matters based on the related art in the pertinent field for a person of ordinary skills in the art. The invention can be practiced based on the contents disclosed in this description and common technical knowledge in the subject field.

In an embodiment of the invention, a positive electrode for a lithium secondary battery includes a positive electrode current collector; and a positive electrode active material layer that is formed on the positive electrode current collector. As the positive electrode current collector, a conductive member formed of a highly conductive metal is preferably used as in the case of a current collector which is used in a positive electrode for a lithium secondary battery of the related art. For example, aluminum or an alloy including aluminum as a major component can be used. The shape of the positive electrode current collector is not particularly limited because it may vary depending on the shape and the like of a lithium secondary battery. For example, the positive electrode current collector may have various shapes such as a rod shape, a plate shape, a sheet shape, and a foil shape.

The positive electrode active material is a positive electrode active material for a lithium secondary battery. The primary particles constituting the positive electrode active material include: a phase (spinel phase) that is formed of a nickel-and-manganese-containing composite oxide having a spinel crystal structure which includes lithium (Li), nickel (Ni), and manganese (Mn); and a phase (layered rock-salt phase) that is formed of a transition metal composite oxide having a layered rock-salt crystal structure which includes lithium (Li) and one transition metal element or two or more transition metal elements. In this specification, "primary particle" refers to the minimum unit constituting the positive electrode active material, and specifically refers to the minimum unit which can be determined based on the geometrical configuration of the appearance. An aggregate of the primary particles is a secondary particle. In the positive electrode active material having the above configuration, under a high-potential charging condition where a battery is charged such that a positive electrode has a high potential of 4.3 V or higher (or 4.5 V or higher) vs. lithium metal, oxygen (O) may be desorbed from the nickel-and-manganese-containing composite oxide having a spinel crystal structure (Ni—Mn spinel-structure oxide), and a part of the nonaqueous electrolyte may be oxidized and decomposed to produce an acid (for example, HF). Even in this case, the transition metal composite oxide constituting the layered rock-salt phase efficiently absorbs the acid. As a result, the elution of the transition metal (in particular, Mn) from the Ni—Mn spinel-structure oxide can be prevented. In addition, when the temperature of a battery increases (for example, 60° C. or higher), the amount of Li deactivated on the surface of a negative electrode may increase, and thus the amount of Li in the Ni—Mn spinel-structure oxide may decrease. Even in this state, Li can be supplied from the transition metal composite oxide constituting the layered rock-salt phase to the Ni—Mn spinel-structure oxide. As a result, when a battery is charged under a high-potential charging condition or is used in a high-temperature condition, the stability (durability) of the positive electrode active material can be improved.

Further, in the positive electrode active material, both the Ni—Mn spinel-structure oxide and the transition metal composite oxide constituting the layered rock-salt phase include oxygen atoms (O) and fluorine atoms (F). That is, a part of oxygen atoms (O) constituting the Ni—Mn spinel-structure oxide and the transition metal composite oxide is substituted with fluorine atoms (F). Typically, in the positive electrode active material, a part of sites is substituted with fluorine, the sites including sites (that is, O sites) where oxygen is coordinated in the crystal structure of the Ni—Mn spinel-structure oxide; and sites (that is, O sites) where oxygen is coordinated in the crystal structure of the transition metal composite oxide constituting the layered rock-salt phase. By the Ni—Mn spinel-structure oxide including F having high electronegativity (electron attracting properties), F can be bonded to Mn with high bonding strength. As a result, in the above high-potential charging state, the elution of Mn from the Ni—Mn spinel-structure oxide can be prevented. In addition, by the transition metal composite oxide constituting the layered rock-salt phase including fluorine atoms (F), F is bonded to the transition metal (for example, Mn) in the transition metal composite oxide constituting the layered rock-salt phase with high bonding strength. Therefore, the oxidation resistance performance of the transition metal composite oxide can be improved. As a result, the supply of Li to the Ni—Mn spinel-structure oxide can be stably continued over a long period of time, and the durability (cycle characteristics) of the entire positive electrode active material can be improved.

In addition, preferably, in the primary particles of the positive electrode active material disclosed herein, no grain boundary (crystal grain boundary) is present at a boundary between the spinel phase and the layered rock-salt phase, and the oxide constituting the spinel phase is bonded to the oxide constituting the layered rock-salt phase through oxygen such that the spinel phase and the layered rock-salt phase cannot be separated from each other. It is preferable that the transition metal composite oxide constituting the layered rock-salt phase is present in a state where the primary particles in the Ni—Mn spinel-structure oxide have no grain boundary. Therefore, in the positive electrode active material having the above configuration, the contact area of the transition metal composite oxide constituting the layered rock-salt phase with the nonaqueous electrolyte is limited. As a result, during the above production of an acid (for example, HF), deterioration of the transition metal composite oxide constituting the layered rock-salt phase caused by the acid can be suppressed. In addition, due to the stable Li supply from the transition metal composite oxide in which the deterioration is suppressed, a deterioration (decrease) in the capacity of the Ni—Mn spinel-structure oxide can be efficiently suppressed.

In the Ni—Mn spinel-structure oxide, typically, a part of Mn sites of a compound represented by the formula $LiMn_2O_4$ may be substituted with Ni. Further, a part of Mn sites may be substituted with other transition metal elements. Since the Ni—Mn spinel-structure oxide constituting the spinel phase has the above configuration, the driving voltage of a lithium secondary battery using this positive electrode active material can be adjusted to be 4.5 V or higher (for example, a so-called order of 5 V) vs. lithium under a high-temperature condition.

It is preferable that the Ni—Mn spinel-structure oxide has an average composition represented by the following Formula (I).

$$LiMn_{2-x-y}Ni_xM_yO_{4-z}F_z \quad (I)$$

In Formula (I), x, y, and z satisfy the following relationships: $0.4 \leq x \leq 0.6$; $0 \leq y \leq 0.6$; and $0 < z \leq 1$. The values of x, y, and z are set in a range where the compound represented by Formula (I) can adopt the spinel structure although they vary depending on the ratios between the respective elements.

In Formula (I), x represents the Ni content ratio in the Ni—Mn spinel-structure oxide. In the Ni—Mn spinel-structure oxide, a part of Mn sites is substituted with Ni. As a result, the improvement of cycle characteristics and the improvement of energy density can be achieved. Accordingly, it is more preferable that $0.42 \leq x$ from the viewpoint of exhibiting the effects of Ni substitution at a high level. In addition, it is more preferable that $x \leq 0.5$ from the viewpoint of stably maintaining the spinel structure. Typically, x may be 0.45.

In Formula (I), z represents the F content ratio in the Ni—Mn spinel-structure oxide (the ratio of O in the Ni—Mn spinel-structure oxide substituted with F). In the above range of $0 < z \leq 1$, as the F content ratio in the Ni—Mn spinel-structure oxide increases, the Mn elution suppressing effect tends to be improved. On the other hand, when the F content ratio in the Ni—Mn spinel-structure oxide (the ratio of O in the Ni—Mn spinel-structure oxide substituted with F) is excessively high (typically, when z in Formula (I) is more than 1), it is difficult to stably maintain the spinel crystal structure. Therefore, it is preferable that $0.001 \leq z \leq 0.8$ (more preferably $0.001 \leq z \leq 0.5$, and still more preferably $0.01 \leq z \leq 0.3$; for example, $0.02 \leq z \leq 0.3$) from the viewpoint of stably maintaining the spinel crystal structure while exhibiting the Mn elution suppressing effect at a high level, in which the Mn elution suppressing effect is obtained by the Ni—Mn spinel-structure oxide including oxygen and fluorine, that is, by a part of O in the Ni—Mn spinel-structure oxide being substituted with F.

Among nickel-and-manganese-containing composite oxides represented by Formula (I), typical examples of a nickel-and-manganese-containing composite oxide in which M is not present and y=0 include a Ni—Mn spinel-structure oxide which satisfies x=0.5 and $0.001 \leq z \leq 0.5$, that is, a compound represented by $LiMn_{1.5}Ni_{0.5}O_{4-z}F_z$. In $LiMn_{1.5}Ni_{0.5}O_{4-z}F_z$, the stability of the spinel crystal structure is high, and the Mn elution suppressing effect which is obtained by the oxide including F (that is, by a portion of O in the oxide being substituted with F) is high.

Alternatively, it is preferable that the nickel-and-manganese-containing composite oxide contains an additional element other than Li, Mn, Ni, O, and F as M. For example, M may be one element or two or more elements selected from the group consisting of: alkali earth metal elements such as magnesium (Mg), calcium (Ca), strontium (Sr), and barium (Ba); transition metal elements such as iron (Fe), titanium (Ti), scandium (Sc), vanadium (V), chromium (Cr), cobalt (Co), copper (Cu), zinc (Zn), yttrium (Y), zirconium (Zr), niobium (Nb), molybdenum (Mo), ruthenium (Ru), rhodium (Rh), palladium (Pd), tantalum (Ta), and tungsten (W); lanthanoid elements such as lanthanum (La), cerium (Ce), and samarium (Sm); non-transition metal elements such as aluminum (Al), gallium (Ga), indium (In), and tin (Sn); metalloid elements such as boron (B), silicon (Si), and antimony (Sb); and nonmetallic elements such as carbon (C), phosphorus (P), and sulfur (S). As M, one element or two or more elements can be appropriately selected from the above exemplary elements to improve battery performance. The improvement of the battery performance includes an increase in energy density, the improvement of durability (cycle characteristics), and the improvement of input and output characteristics.

When the nickel-and-manganese-containing composite oxide contains an additional element other than Li, Mn, Ni, O, and F as M, typically, M in Formula (I) may be one element or two or more elements selected from the group consisting of iron (Fe), titanium (Ti), aluminum (Al), silicon (Si), magnesium (Mg), calcium (Ca), barium (Ba), strontium (Sr), scandium (Sc), vanadium (V), chromium (Cr), cobalt (Co), copper (Cu), zinc (Zn), gallium (Ga), yttrium (Y), ruthenium (Ru), rhodium (Rh), palladium (Pd), indium (In), tin (Sn), antimony (Sb), lanthanum (La), cerium (Ce), samarium (Sm), zirconium (Zr), niobium (Nb), tantalum (Ta), molybdenum (Mo), tungsten (W), boron (B), carbon (C), phosphorus (P), and sulfur (S). In particular, silicon (Si), cobalt (Co), lanthanum (La), zirconium (Zr), niobium (Nb), tantalum (Ta), tungsten (W), and boron (B) are preferable elements which may be contained as M.

In a nickel-and-manganese-containing composite oxide which contains at least Fe and/or Ti as M, the bonding strength between the transition metal and oxygen in the nickel-and-manganese-containing composite oxide can be increased. As a result, even when a battery is charged such that a positive electrode has a high potential of 4.3 V or higher vs. lithium metal, the elution of the transition metal element (typically manganese) from the nickel-and-manganese-containing composite oxide can be suppressed. That is, the nickel-and-manganese-containing composite oxide which contains at least Fe and/or Ti as M (typically, in which a part of nickel and manganese constituting the nickel-and-manganese-containing composite oxide is substituted with Fe and/or Ti) is preferable because the stability (durability) of the positive electrode active material can be improved in a high-potential state. In particular, from the viewpoint of stably maintaining the spinel crystal structure, the nickeland-manganese-containing composite oxide may not contain an element other than Fe and Ti as M in Formula (I).

Here, it is preferable that the Ni—Mn spinel-structure oxide including Ti and Fe is represented by the following Formula (III).

$$LiMn_{2-x-y1-y2-y3}Ni_xTi_{y1}Fe_{y2}M'_{y3}O_{4-z}F_z \quad (III)$$

Here, the Ni—Mn spinel-structure oxide represented by Formula (III) corresponds to a nickel-and-manganese-containing composite oxide containing at least Fe and Ti as M among the Ni—Mn spinel-structure oxides represented by Formula (I). The x and z in Formula (III) have the same definitions as those in Formula (I). In Formula (III), y1, y2, and y3 satisfy the following relationships: $0<y1\leq0.2$; $0<y2\leq0.2$; and $0\leq y3\leq0.2$. The values of x, y1, y2, y3, and z are set in a range where the compound represented by Formula (III) can adopt the spinel structure although they vary depending on the ratios between the respective elements. In Formula (III), M' represents an additional element (M') other than Li, Mn, Ni, Ti, Fe, O, and F in the nickel-and-manganese-containing composite oxide. M' may not be present or may be one element or two or more elements selected from the examples of the addition element (M) in Formula (I) other than Ti and Fe. In a preferred embodiment, M is not present.

When the Ti content ratio in the Ni—Mn spinel-structure oxide represented by Formula (III) is excessively high (typically, when y1 in Formula (III) is more than 0.2), the electron conductivity of the positive electrode active material may decrease, and the battery resistance may increases in a lithium secondary battery in which a positive electrode has an upper limit action potential of is 4.5 V or higher vs. lithium metal. Therefore, it is preferable that $0<y1\leq0.15$ (more preferably $0<y1\leq0.1$, and still more preferably $0.01\leq y1\leq0.1$) from the viewpoint of suppressing an increase in battery resistance while exhibiting the Mn elution suppressing effect at a high level, in which the Mn elution suppressing effect is obtained by a part of Ni and Mn being substituted with Ti and Fe.

When the Fe content ratio in the nickel-and-manganese-containing composite oxide is excessively high (typically, when y2 in Formula (III) is more than 0.2), the capacity of a battery, which stably operates when a positive electrode has a the upper limit action potential of 4.5 V to 5 V vs. lithium metal, may decrease. Therefore, it is preferable that $0<y2\leq0.15$ (more preferably $0<y2\leq0.1$, and still more preferably $0.01\leq y2\leq0.1$) from the viewpoint of suppressing an decrease in battery capacity while exhibiting the Mn elution suppressing effect at a high level, in which the Mn elution suppressing effect is obtained by a part of Ni and Mn in the nickel-and-manganese-containing composite oxide being substituted with Ti and Fe.

More preferable examples of the nickel-and-manganese-containing composite oxide represented by Formula (III) include an nickel-and-manganese-containing composite oxide which satisfies x=0.45, y1=0.05, y2=0.05, y3=0, and $0.001\leq z\leq0.5$, that is, a nickel-and-manganese-containing composite oxide represented by $LiMn_{1.45}Ni_{0.45}Ti_{0.05}Fe_{0.05}O_{4-z}F_z$. In $LiMn_{1.45}Ni_{0.45}Ti_{0.05}Fe_{0.05}O_{4-z}F_z$, the stability of the spinel crystal structure is extremely high, and the Mn elution suppressing effect which is obtained by the nickel-and-manganese-containing composite oxide containing F (that is, by a portion of O in the oxide being substituted with F) is extremely high. In addition, oxygen desorption from the Ni—Mn spinel-structure oxide can be suppressed, and the oxidation decomposition of the nonaqueous electrolyte and the production of an acid (for example, HF) can be reduced.

The layered rock-salt phase is formed of a transition metal composite oxide having a layered crystal structure (layered rock-salt crystal structure) which includes lithium (Li) and one transition metal element or two or more transition metal elements. The composition of the transition metal composite oxide constituting the layered rock-salt phase is not particularly limited. A lithium transition metal composite oxide which is commonly used as a positive electrode active material of a lithium secondary battery may be a compound which is recognized as a so-called manganese composite oxide or a so-called nickel-manganese composite oxide having a layered rock-salt crystal structure. Typical examples of the transition metal composite oxide having a layered rock-salt crystal structure include a compound represented by the formula $LiMnO_2$. Alternatively, the transition metal composite oxide may be a so-called lithium-rich (lithium-excess) compound (Li-excess layered Mn oxide) represented by the formula $Li_2MnO_3$. In particular, in a state where the amount of Li in the spinel phase decreases at a high temperature of a battery (for example, 60° C. or higher), the Li-excess layered Mn oxide is preferable because it is superior in Li supply ability to the Ni—Mn spinel-structure oxide constituting the spinel phase and can efficiently suppress a decrease in the capacity of the entire positive electrode active material. Therefore, in the positive electrode active material in which the transition metal composite oxide constituting the layered rock-salt phase is the Li-excess layered Mn oxide, high durability can be exhibited. Even when a part of the nonaqueous electrolyte is oxidized and decomposed on the surface of the spinel phase to produce an acid (typically, HF), the Li-excess layered Mn oxide can suitably absorb the acid. Therefore, the elution of the transition metal element (typically, Mn) from the spinel phase can be efficiently suppressed. Therefore, the positive electrode active material can exhibit high durability.

It is preferable that the Li-excess layered Mn oxide has an average composition represented by the following Formula (II).

$$Li_{(2-a)}M1_{(1+a)}O_{3-b}F_b \quad (II)$$

In Formula (II), M1 represents manganese (Mn) or at least two elements including Mn. The a and b satisfy the following relationships: $0\leq a\leq0.5$; and $0<b\leq1$. The values of a and b in Formula (II) are set in a range where the compound represented by Formula (II) can adopt the layered crystal structure although they vary depending on the ratios between the respective elements. Typically, more preferred examples satisfy the following conditions.

In Formula (II), a is a value which is used to set the amount of Li in the transition metal composite oxide constituting the layered rock-salt phase or to set the content of M1. That is, in Formula (II), (2−a) represents the amount of Li in the Li-excess layered Mn oxide constituting the layered rock-salt phase, and (1+a) represents the content of the metal element (M1) in the Li-excess layered Mn oxide. From the viewpoints of the absorption of an acid (typically, HF) and the Li supply ability, it is preferable that the amount of Li in the Li-excess layered Mn oxide is in a more excessive state. Therefore, it is preferable that $0\leq a\leq0.3$, and it is more preferable that a is approximately 0.

In Formula (II), b represents the F content ratio in the Li-excess layered Mn oxide constituting the layered rock-salt phase (the ratio of O in the composite oxide substituted with F). In the above range of $0<b\leq1$, as the F content ratio in the Li-excess layered Mn oxide increases, oxidation resistance performance, which is obtained by the Li-excess layered Mn oxide including F (that is, by a part of O constituting the oxide being substituted with F), tends to be improved. On the other hand, when the F content ratio in the Li-excess layered Mn oxide (the ratio of O in the Li-excess layered Mn oxide substituted with F) is excessively high (typically, when b in Formula (II) is more than 1), it is difficult to stably maintain the layered crystal structure. Therefore, it is preferable that $0.01 \leq b \leq 0.8$ (more preferably $0.01 \leq b \leq 0.5$, and still more preferably $0.01 \leq b \leq 0.4$; for example, $0.02 \leq b \leq 0.1$) from the viewpoint of stably maintaining the layered crystal structure while exhibiting the oxidation resistance performance at a high level, in which the oxidation resistance performance is obtained by the transition metal composite oxide including F (that is, by a part of O in the oxide being substituted with F).

In Formula (II), M1 represents manganese (Mn) or at least two elements including Mn. That is, M1 may be only Mn or may further include one metal element or two or more elements other than Mn. The metal element other than Mn which may be contained as M1 may be one element or two or more elements selected from the group consisting of: alkali earth metal elements such as magnesium (Mg), calcium (Ca), strontium (Sr), and barium (Ba); transition metal elements such as nickel (Ni), iron (Fe), titanium (Ti), scandium (Sc), vanadium (V), chromium (Cr), cobalt (Co), copper (Cu), zinc (Zn), yttrium (Y), zirconium (Zr), niobium (Nb), molybdenum (Mo), ruthenium (Ru), rhodium (Rh), palladium (Pd), silver (Ag), hafnium (Hf), tantalum (Ta), tungsten (W), and gold (Au); lanthanoid elements such as lanthanum (La), cerium (Ce), and samarium (Sm); and base metal elements such as aluminum (Al), gallium (Ga), indium (In), and tin (Sn). Among these, as the metal element other than Mn which may be contained as M1 in Formula (II), one element or two or more elements selected from various transition metal elements in Groups 3 to 11 of the periodic table are preferable. Among these, one element or two or more elements selected from Ni, Ti, and Fe are preferable.

Strictly, $O_{4-z}$ in Formulae (I) and (III) and $O_{3-b}$ in Formula (II) represent $O_{4-z-\delta}$ and $O_{3-b-\delta}$, respectively. Here, $\delta$ represents the oxygen deficiency amount, and it is difficult to exactly show the value thereof because $\delta$ varies depending on the kind of substitutional atoms in the crystal structure of each oxide, the substitution ratio thereof, and environmental conditions. Therefore, $\delta$ which is a variable for determining the number of oxygen atoms typically represents a positive number not exceeding 1 or zero. For example, $0 \leq \delta \leq 1$ may be adopted. However, in this specification, the configuration of substituting a part of O in the Ni—Mn spinel-structure oxide and the Li-excess layered Mn oxide with F is considered. Therefore, compounds are described without $\delta$ for convenience of description as in the description of the preferable examples of the composite oxides. However, even in this case, the same compounds are represented. That is, even when $O_{4-z}$ in Formulae (I) and (III) is described as $O_{4-z-\delta}$ and $O_{3-b}$ in Formula (II) is described as $O_{3-b-\delta}$, this description is not intended to limit the technical scope of the invention.

Next, the existence forms of the spinel phase and the layered rock-salt phase in the primary particle of the positive electrode active material will be described. In the positive electrode active material for a lithium secondary battery according to the embodiment of the invention, at least a portion of an interface between the spinel phase and the layered rock-salt phase matches an oxygen plane in each crystal structure thereof. In this matching state, essentially, an arbitrary oxygen plane in the crystal structure of the oxide constituting the spinel phase and an arbitrary oxygen plane in the crystal structure of the oxide constituting the layered rock-salt phase are substantially parallel to each other and share an oxygen position at an interface thereof. As a result, the oxygen planes are substantially continuously (in other words, substantially in a flush state) bonded to each other. That is, the spinel phase and the layered rock-salt phase are bonded to each other through oxygen constituting the respective oxygen planes. That is, respective boundaries of the nickel-and-manganese-containing composite oxide constituting the spinel phase and the transition metal composite oxide constituting the layered rock-salt phase are bonded to each other through a bond with oxygen. Accordingly, the interface in this matching state has no crystal grain boundary in which impurities, other deposits, and the like are present. The interface (boundary) having no crystal grain boundary can be observed using, for example, a transmission electron microscope (TEM). When it can be observed as a whole that the oxygen planes of both the phases are substantially continuously arranged, a small difference (so-called mismatching) between lattice spacings is allowable.

In the positive electrode active material, the ratios of the nickel-and-manganese-containing composite oxide constituting the spinel phase and the transition metal composite oxide constituting the layered rock-salt phase are not particularly limited. However, a ratio of the transition metal composite oxide constituting the layered rock-salt phase (an abundance ratio of the transition metal composite oxide constituting the layered rock-salt phase) is preferably 1 mol % to 10 mol % and more preferably 3 mol % to 8 mol % with respect to 100 mol % of the total amount of the nickel-and-manganese-containing composite oxide constituting the spinel phase and the transition metal composite oxide constituting the layered rock-salt phase. The positive electrode active material having the above configuration has a sufficient amount of the Ni—Mn spinel-structure oxide and thus can be preferably used as a high-potential positive electrode active material. On the other hand, even in a state where the amount of Li in the Ni—Mn spinel-structure oxide decreases, the positive electrode active material includes the transition metal composite oxide constituting the layered rock-salt phase in a sufficient amount for the supply of Li from the transition metal composite oxide constituting the layered rock-salt phase. Therefore, a deterioration (decrease) in the capacity of the Ni—Mn spinel-structure oxide can be efficiently suppressed. On the other hand, when the abundance ratio of the transition metal composite oxide constituting the layered rock-salt phase is lower than 1 mol %, the acid absorption effect obtained by the layered-structure oxide is low, and a deterioration of the spinel-structure oxide caused by the acid may not be suppressed sufficiently. In addition, when a battery is charged and discharged to 4.5 V or higher (vs. Li$^+$/Li) under a high-temperature condition, a lithium supplement effect is low. Accordingly, from the viewpoint of suppressing a decrease in battery capacity (a decrease in cycle characteristics), the abundance ratio of the transition metal composite oxide constituting the layered rock-salt phase is preferably 1 mol % or higher, more preferably 2 mol % or higher, still more preferably 3 mol % or higher, and even still more preferably 4 mol % or higher. On the other hand, when the abundance ratio of the transition metal composite oxide constituting the layered rock-salt phase is higher than 10 mol %, the contact area between the transition metal composite oxide constituting the layered rock-salt phase and the electrolytic solution (electrolyte) increases. Therefore, a deterioration of the transition metal composite oxide constituting the layered rock-salt phase may not be sufficiently suppressed. Accordingly, from the viewpoint of suppressing an increase in battery resistance, the abundance ratio of the transition metal composite oxide constituting the layered rock-salt phase is preferably lower than 10 mol %, more preferably 8 mol % or lower, and still more preferably 7 mol % or lower.

The compositions of the nickel-and-manganese-containing composite oxide constituting the spinel phase and the transition metal composite oxide constituting the layered rock-salt phase, and the ratios of the nickel-and-manganese-containing composite oxide and the transition metal composite oxide can be verified using various well-known analysis methods. For example, the composition of each phase and the ratio thereof can be verified using, for example, X-ray diffraction (XRD), TEM observation, or Inductively coupled plasma atomic emission spectroscopy (ICP-AES). More specifically, regarding the ratios of the Ni—Mn spinel-structure oxide constituting the spinel phase and the transition metal composite oxide (typically the Li-excess layered Mn oxide) constituting the layered rock-salt phase, the abundance ratios of both the oxides can be specified, for example, by measuring the intensity of a peak derived from the transition metal composite oxide of the layered rock-salt phase relative to a peak of the Ni—Mn spinel-structure oxide of the spinel phase having a spinel crystal structure in an XRD pattern of the positive electrode active material as a target. In order to specify the abundance ratio of the transition metal composite oxide constituting the layered rock-salt phase, a calibration curve may be prepared from, for example, the intensity of the peak derived from the transition metal composite oxide constituting the layered rock-salt phase having a layered crystal structure at about $2\theta=36.8°$ in the XRD diffraction pattern; and the abundance ratio thereof. The abundance ratios of the nickel-and-manganese-containing composite oxide constituting the spinel phase and the transition metal composite oxide constituting the layered rock-salt phase can be obtained, for example, by fitting the XRD diffraction pattern based on Rietveld analysis. In addition, the addition of not only oxygen but also fluorine to the oxide constituting each phase (in the nickel-and-manganese-containing composite oxide constituting the spinel phase and the transition metal composite oxide constituting the layered rock-salt phase), that is, the abundance ratio of fluorine in the nickel-and-manganese-containing composite oxide constituting the spinel phase and the abundance ratio of fluorine in the transition metal composite oxide constituting the layered rock-salt phase can be verified using, for example, well-known lanthanum-alizarin complexon absorptiometry, ion chromatography, or atomic absorption spectrometry.

Hereinafter, a method of producing the positive electrode active material including the spinel phase and the layered rock-salt phase will be described. The method according to the embodiment of the invention includes: a step of preparing a precursor of the nickel-and-manganese-containing composite oxide having the spinel crystal structure and the transition metal composite oxide having the layered crystal structure; and a firing step.

In the precursor preparation step, a precursor compound including constituent elements (typically, transition metal elements) other than lithium, oxygen, and fluorine, which are contained in the spinel phase and the layered rock-salt phase, is prepared. Hereinafter, a case of producing the positive electrode active material including the spinel phase, which is formed of the Ni—Mn spinel-structure oxide represented by Formula (I), and the layered rock-salt phase, which is formed of the transition metal composite oxide represented by Formula (II), will be described. An aqueous solution including salts is added with a basic aqueous solution having a pH of 11 to 14 and is stirred, in which the salts independently include the respective constituent elements (typically, transition metal elements) other than lithium, oxygen, and fluorine in Formulae (I) and (II) (or the salts include at least two metal elements). Due to a liquid-phase reaction in the aqueous solution, a precursor represented by the formula $Mn_{2-x-y}Ni_xM_y(OH)_{4+m}$ (wherein m represents zero or a positive number not exceeding 1; typically $0 \leq m \leq 0.5$) is prepared. x, y, and M have the same definitions as those in Formula (I). Examples of the basic aqueous solution include an aqueous solution of either a strong base (for example a hydroxide of alkali metal) or a weak base (for example, ammonia); and an aqueous mixed solution of a strong base and a weak base. As the basic aqueous solution, an aqueous solution, whose pH at a solution temperature of 25° C. is maintained to be about 11 to 14 and that does not hinder the production of the precursor, can be preferably used. For example, as sodium hydroxide aqueous solution or ammonia water can be used.

In the precursor preparation step, the aqueous solution can be prepared, for example, by dissolving a desired nickel salt, a desired manganese salt, a desired titanium salt, a desired iron salt, and the like in an aqueous solvent in predetermined amounts. The order of adding the salts to the aqueous solvent is not particularly limited. In addition, the aqueous solution may be prepared by mixing aqueous solutions of the respective salts. Anions of the metal salts (the nickel salt, the manganese salt, and the like) may be selected such that the respective salts have desired water-solubility. For example, the anions may be a sulfate ion, a nitrate ion, a chloride ion, a carbonate ion, and the like. That is, the metal salts may be a sulfate, a nitrate, a hydrochloride, a carbonate, and the like of nickel, manganese, and the like. Some or all of the anions of the metal salts may be the same as or different from each other. For example, a combination of nickel sulfate and manganese carbonate can be used. The salts may be solvates such as hydrates. The order of adding the metal salts is not particularly limited.

Further, excess amounts of a lithium salt (Li source) and a fluorine compound (fluorine source) are added to the precursor, and the components are mixed. As a result, a non-fired raw material for producing a desired positive electrode active material is obtained, the desired positive electrode active material including the spinel phase and the layered rock-salt phase, in which oxides constituting the respective phases include not only oxygen atoms but also fluorine atoms (typically, a part of oxygen atoms in the oxides is substituted with fluorine atoms). The positive electrode active material having the desired composition can be obtained by adjusting the kinds and the addition amounts of the lithium salt, the other salts, and the fluorine compound to be added.

The fluorine compound and the raw material compound (the above precursor) are mixed with each other, and the obtained mixture is fired. As a result, F can be introduced into the nickel-and-manganese-containing composite oxide constituting the spinel phase (a part of O constituting the nickel-and-manganese-containing composite oxide can be substituted with F). In addition, F can be introduced into the transition metal composite oxide constituting the layered rock-salt phase (a part of O constituting the transition metal composite oxide can be substituted with F). As the fluorine compound, for example, lithium fluoride or ammonium fluoride can be preferably used. In particular, lithium fluoride is preferable because it also functions as the lithium salt.

Among these fluorine compounds, one kind may be used alone, or at least two kinds may be used in combination. As the lithium salt, the above lithium fluoride or a well-known lithium salt which is used to form a lithium composite oxide of the related art can be used without any particular limitation. Specific examples of the well-known lithium salt include lithium carbonate and lithium hydroxide. Among these lithium salts, one kind may be used alone, or at least two kinds may be used in combination.

The addition amounts of the fluorine compound (typically, lithium fluoride) and the lithium salt (for example, lithium carbonate, lithium hydroxide, or lithium fluoride) can be set such that the compositions of the elements constituting the spinel phase and the layered rock-salt phase of the synthesized positive electrode active material have a desired composition ratio, for example, in the range represented by Formula (I) or (II). For example, when the total amount of the transition metals in the precursor is 2 mol, the addition amount of the lithium salt (for example, lithium carbonate, lithium hydroxide, or lithium fluoride) can be set such that the amount of Li is about 1.1 mol (typically, 1.1 mol to 1.3 mol; for example, about 1.2 mol), that is, the ratio of Li added is higher than the ratio of lithium contained in the spinel phase. In addition, when the total amount of the transition metals in the precursor is 2 mol, for example, the addition amount of the fluorine compound to be used can be set such that the amount of F is about 0.001 mol or higher (typically, 0.01 mol or higher; for example, about 0.02 mol or higher) and 1.0 mol or lower (typically, 0.8 mol or lower; for example, 0.5 mol or lower, preferably, 0.3 mol or lower).

In the firing step, the non-fired raw material is fired to synthesize the desired positive electrode active material. The firing temperature is preferably in a range of 700° C. to 1000° C. The firing may be performed in one go at the same temperature or through several steps at different temperatures. The firing time can be appropriately selected. For example, the firing may be performed at about 800° C. to 1000° C. for about 2 hours to 24 hours. Alternatively, the firing may be performed at about 700° C. to 800° C. for about 1 hour to 12 hours and then further performed at about 800° C. to 1000° C. for about 2 hours to 24 hours.

Alternatively, instead of adding the fluorine compound in the firing step, the positive electrode active material which is synthesized by firing the mixture of the precursor and the lithium salt is exposed to a fluorine gas atmosphere. As a result, F can be introduced into the nickel-and-manganese-containing composite oxide constituting the spinel phase (a part of O constituting the nickel-and-manganese-containing composite oxide can be substituted with F). In addition, F can be introduced into the transition metal composite oxide constituting the layered rock-salt phase (a part of O constituting the transition metal composite oxide can be substituted with F).

By performing an appropriate pulverization treatment (for example, a pulverization treatment using a ball mill) or a treatment such as sieving after the firing, a positive electrode active material having desired properties (for example, average particle size) can be obtained. The positive electrode active material is not particularly limited, but a powder which is substantially formed of secondary particles having a particle size of 1 μm to 25 μm (typically, 2 μm to 20 μm; for example, 5 μm to 15 μm can be preferably used as the positive electrode active material, in which the particle size corresponds to a cumulative value of 50% (median size: D50) in a volume particle size distribution obtained using a general laser diffraction particle size distribution analyzer. Hereinafter, unless described in detail, "the average particle size of the positive electrode active material" refers to the median size of the secondary particles of the positive electrode active material (D50; the particle size corresponding to a cumulative value of 50% in order from the smallest particle size in a volume particle size distribution which is obtained by particle size distribution measurement based on a general laser diffraction laser scattering method).

As the positive electrode current collector, a conductive member formed of a highly conductive metal is preferably used as in the case of a current collector which is used in a positive electrode for a lithium secondary battery of the related art. For example, aluminum or an alloy including aluminum as a major component can be used. The shape of the positive electrode current collector is not particularly limited because it may vary depending on the shape and the like of a lithium secondary battery. For example, the positive electrode current collector may have various shapes such as a rod shape, a plate shape, a sheet shape, and a foil shape.

In addition to the positive electrode active material, optionally, the positive electrode active material layer may further include optional components such as a conductive material and a binder. As the conductive material, for example, a carbon material such as carbon black (for example, acetylene black or Ketjen black) is preferably used. As the binder, for example, various polymer materials such as polyvinylidene fluoride (PVDF) or polyethylene oxide (PEO) can be used.

Hereinafter, a preferred embodiment of a lithium secondary battery will be described with reference to the drawings but is not intended to limit the embodiment of the invention. The shape (external appearance and size) of the lithium secondary battery is not particularly limited. In the following embodiment, a lithium secondary battery having a configuration in which a wound electrode body and an electrolytic solution are accommodated in a square battery case will be described as an example. In the following drawings, parts or portions having the same function are represented by the same reference numerals, and repeated description will not be made. In each drawing, a dimensional relationship (for example, length, width, or thickness) does not necessarily reflect the actual dimensional relationship.

Figure 2:
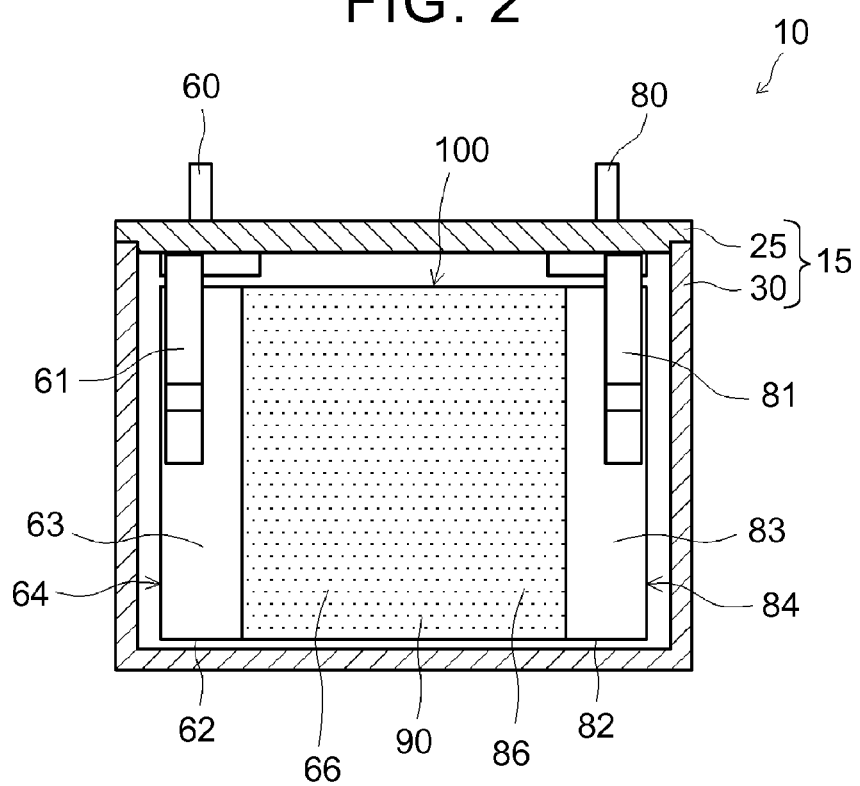
FIG. 2 is a cross-sectional view taken along line II-II of FIG. 1.

As shown in FIGS. 1 and 2, a lithium secondary battery 10 according to the embodiment includes a battery case 15. The battery case 15 according to the embodiment is formed of metal (for example, aluminum). This battery case 15 includes: a flat box-shaped (typically, a rectangular shape) case body (external case) 30 having an open upper end and a closed bottom; and a lid 25 that covers the opening of the case body 30. In a top surface (that is, the lid 25) of the battery case 15, a positive electrode terminal 60, which is electrically connected to a positive electrode sheet 64 of a wound electrode body 100, and a negative electrode terminal 80, which is electrically connected to a negative electrode sheet 84 of the wound electrode body 100, are provided. In addition, in the lid 25, typically, an injection port (not shown) is formed through which a nonaqueous electrolytic solution described below is inserted into the case body 30 (battery case 15) that accommodates the wound electrode body 100. After the injection of the nonaqueous electrolytic solution, the injection port is sealed with a sealing plug. Further, as in the case of a lithium secondary battery of the related art, the lid 25 may further include a safety valve 40 for discharging gas, produced from the inside of the battery case 15, to the outside of the battery case 15 during an abnormal situation of the battery. The wound electrode body 100 is accommodated in case body 30 in a posture in which a winding axis of the wound electrode body 100 lies sideways (that is, the opening is formed in the normal direction of the winding axis of the wound electrode body 100). Next, the opening of the case body 30 is sealed with the lid 25 to prepare the lithium secondary battery (nonaqueous electrolyte secondary battery) 10. The lid 25 and the case body 30 are joined to each other, for example, by welding.

The wound electrode body 100 is prepared by laminating the elongated positive electrode sheet 64 and the elongated negative electrode sheet 84 with two elongated separator sheets 90 in total interposed therebetween and winding the obtained laminate in the longitudinal direction. During the lamination, the positive electrode sheet 64 and the negative electrode sheet 84 overlap each other after being slightly shifted in the width direction such that a positive electrode active material layer non-forming portion 63 (that is, a portion where a positive electrode current collector 62 is exposed without a positive electrode mixture layer 66 being formed) of the positive electrode sheet 64 and a negative electrode active material layer non-forming portion 83 (that is, a portion where a negative electrode current collector 82 is exposed without a negative electrode mixture layer 86 being formed) of the negative electrode sheet 84 protrude from both sides of the separator sheets 90 in the width direction. As a result, at the center of the wound electrode body 100 in the winding axial direction, the laminate is formed in which the positive electrode sheet 64, the negative electrode sheet 84, and the separator sheets 90 are laminated and wound.

As shown in FIG. 2, the positive electrode terminal 60 (formed of, for example, aluminum) is joined to the positive electrode active material layer non-forming portion 63 of the wound electrode body 100 through a positive electrode current collector plate 61 such that the positive electrode sheet 64 of the wound electrode body 100 and the positive electrode terminal 60 are electrically connected to each other. Likewise, the negative electrode terminal 80 (formed of, for example, nickel) is joined to the negative electrode active material layer non-forming portion 83 through a negative electrode current collector plate 81 such that the negative electrode sheet 84 and the negative electrode terminal 80 are electrically connected to each other. The positive and negative electrode terminals 60, 80 and the positive and negative electrode active material layer non-forming portions 63, 83 (typically, the positive and negative electrode current collectors 62, 82) are joined to each other, respectively by, for example, ultrasonic welding or resistance welding.

As the separator, a well-known separator of the related art can be used without any particular limitation. For example, a porous sheet (microporous resin sheet) formed of resin can be preferably used. A porous polyolefin resin sheet formed of, for example, polyethylene (PE) or polypropylene (PP) is preferable. For example, a PE single-layer sheet, a PP single-layer sheet, a sheet having a two-layer structure (PE/PP structure) in which a PE layer and a PP layer are laminated, or a sheet having a three-layer structure (PP/PE/PP structure) in which a PP layer is laminated on both sides of a PE layer can be preferably used.

In the nonaqueous electrolyte, typically, an organic solvent (nonaqueous solvent) includes a supporting electrolyte. As the supporting electrolyte, for example, a lithium salt or a sodium salt can be used. Among these, a lithium salt such as $LiPF_6$ or $LiBF_4$ can be preferably adopted. As the organic solvent, aprotic solvents such as carbonates, esters, and ethers can be used. Among these, carbonates such as ethylene carbonate (EC), diethyl carbonate (DEC), dimethyl carbonate (DMC), and ethyl methyl carbonate (EMC) can be preferably adopted. Alternatively, fluorine solvents, for example, fluorinated carbonates such as monofluoroethylene carbonate (MFEC), difluoroethylene carbonate (DFEC), monofluoromethyl difluoromethyl carbonate (F-DMC), and trifluoro dimethyl carbonate (TFDMC) can be preferably used.

The positive electrode active material is a high-potential positive electrode active material which is characterized in that, even when a battery is repeatedly charged and discharged under a condition of being charged to a high-potential state (typically, a positive electrode has a high potential of 4.3 V or higher vs. lithium metal), the elution of the transition metal element (typically, Mn) from the positive electrode active material can be suppressed and the durability is superior. In addition, when the other positive electrode of a lithium secondary battery includes the positive electrode active material, a decrease (deterioration) in battery capacity during a high-potential use can be suppressed, and cycle characteristics can be improved. Therefore, by using the positive electrode active material according to the embodiment of the invention, a lithium secondary battery having high reliability and superior cycle characteristics (durability) can be provided.

Hereinafter, several examples relating to the invention will be described, but the examples are not intended to limit the invention.

Hereinafter, the preparation of positive electrode active materials of Comparative Examples 1 to 6 and Examples 1 and 2 according to the invention will be described.

Nickel sulfate and manganese sulfate were dissolved in water such that a molar ratio Mn:Ni of the metal elements was 1.5:0.5. The solution was stirred while adding sodium hydroxide thereto. As a result, a precursor according to Comparative Example 1 was obtained. The precursor according to Comparative Example 1 and lithium carbonate were mixed with each other such that the amount of Li in lithium carbonate was 1 mol with respect to 2 mol of the total amount of the transition metal elements (Mn and Ni) in the precursor (that is, a molar ratio (Total Amount of Transition Metal Elements in Precursor:Li in Lithium Carbonate) was 2:1). The mixture was fired at 900° C. for 15 hours under the air atmosphere and was pulverized using a ball mill. As a result, a positive electrode active material according to Comparative Example 1 was obtained. When primary particles constituting the positive electrode active material were analyzed by X-ray diffraction (Rietveld analysis), ICP emission spectroscopy, and absorptiometry (lanthanum-alizarin complexon absorptiometry), it was found that the primary particles were formed of a spinel crystal structure of $LiMn_{1.5}Ni_{0.5}O_4$.

Nickel sulfate and manganese sulfate were dissolved in water such that a molar ratio Mn:Ni of the metal elements was 1.5:0.5. The solution was stirred while adding sodium hydroxide thereto. As a result, a precursor according to Comparative Example 2 was obtained. The precursor according to Comparative Example 2 and lithium carbonate were mixed with each other such that the amount of Li in lithium carbonate was 1.2 mol with respect to 2 mol of the total amount of the transition metal elements (Mn and Ni) in the precursor (that is, a molar ratio (Total Amount of Transition Metal Elements in Precursor:Li in Lithium Carbonate) was 2:1.2). Next, the mixture was fired at 900° C. for 15 hours under the air atmosphere and was pulverized using a ball mill. As a result, a positive electrode active material according to Comparative Example 2 was obtained. When primary particles constituting the positive electrode active material were analyzed by X-ray diffraction (Rietveld analysis), ICP emission spectroscopy, and absorptiometry (lanthanum-alizarin complexon absorptiometry), it was found that the primary particles contained a spinel phase formed of a spinel crystal structure of $LiMn_{1.5}Ni_{0.5}O_4$ and a layered rock-salt phase formed of a layered rock-salt crystal structure of $Li_2MnO_3$ (hereinafter, the primary particles of the positive electrode active material will also be referred to as "$LiMn_{1.5}Ni_{0.5}O_4+Li_2MnO_3$"). In addition, it was verified that these phases were present at a molar ratio ($LiMn_{1.5}Ni_{0.5}O_4:Li_2MnO_3$) of 0.95:0.05 (that is, the ratio of $Li_2MnO_3$ was 5 mol % with respect to 100 mol % of the total amount of the positive electrode active material)

Nickel sulfate and manganese sulfate were dissolved in water such that a molar ratio Mn:Ni of the metal elements was 1.5:0.5. The solution was stirred while adding sodium hydroxide thereto. As a result, a precursor according to Comparative Example 3 was obtained. The precursor according to Comparative Example 3, lithium carbonate, and lithium fluoride were mixed with each other such that the total amount Li in lithium carbonate and lithium fluoride was 1 mol and the amount of F in lithium fluoride was 0.05 mol with respect to 2 mol of the total amount of the transition metal elements (Mn and Ni) in the precursor (that is, a molar ratio (Total Amount of Transition Metal Elements in Precursor:Li in Lithium Carbonate and Lithium Fluoride:F in Lithium Fluoride) was 2:1:0.05). Next, the mixture was fired at 900° C. for 15 hours and was pulverized using a ball mill. As a result, a positive electrode active material according to Comparative Example 3 was obtained. When the X-ray diffraction profile was analyzed based on Rietveld analysis, it was found that primary particles constituting the positive electrode active material were formed of a spinel crystal structure of $LiMn_{1.5}Ni_{0.5}O_{3.95}F_{0.05}$.

Nickel sulfate and manganese sulfate were dissolved in water such that a molar ratio Mn:Ni of the metal elements was 1.5:0.5. The solution was stirred while adding sodium hydroxide thereto. As a result, a precursor according to Example 1 was obtained. The precursor according to Example 1, lithium carbonate, and lithium fluoride were mixed with each other such that the total amount Li in lithium carbonate and lithium fluoride was 1.2 mol and the amount of F in lithium fluoride was 0.05 mol with respect to 2 mol of the total amount of the transition metal elements (Mn and Ni) in the precursor (that is, a molar ratio (Total Amount of Transition Metal Elements in Precursor:Li in Lithium Carbonate and Lithium Fluoride:F in Lithium Fluoride) was 2:1.2:0.05). Next, the mixture was fired at 900° C. for 15 hours under the air atmosphere and was pulverized using a ball mill. As a result, a positive electrode active material according to Example 1 was obtained. When primary particles constituting the positive electrode active material were analyzed by X-ray diffraction (Rietveld analysis), ICP emission spectroscopy, and absorptiometry (lanthanum-alizarin complexon absorptiometry), it was found that the primary particles contained a spinel phase formed of a spinel crystal structure of $LiMn_{1.5}Ni_{0.5}O_{3.95}F_{0.05}$ and a layered rock-salt phase formed of a layered rock-salt crystal structure of $Li_2MnO_{2.96}F_{0.04}$ (hereinafter, the primary particles of the positive electrode active material will also be referred to as "$LiMn_{1.5}Ni_{0.5}O_{3.95}F_{0.05}+Li_2MnO_{2.96}F_{0.04}$"). In addition, it was verified that these phases were present at a molar ratio ($LiMn_{1.5}Ni_{0.5}O_{3.95}F_{0.05}:Li_2MnO_{2.96}F_{0.04}$) of 0.95:0.05 (that is, the ratio of $Li_2MnO_{2.96}F_{0.04}$ was 5 mol % with respect to 100 mol % of the total amount of the positive electrode active material)

A positive electrode active material according to Comparative Example 4 was obtained using the same materials and process as those of Comparative Example 1, except that a precursor according to Comparative Example 4 was obtained by dissolving manganese sulfate, nickel sulfate, iron sulfate, and titanium sulfate in water such that a molar ratio Mn:Ni:Fe:Ti of the metal elements was 1.45:0.45:0.05:0.05; and then stirring the solution while adding sodium hydroxide thereto. When primary particles constituting the positive electrode active material were analyzed by X-ray diffraction (Rietveld analysis), ICP emission spectroscopy, and absorptiometry (lanthanum-alizarin complexon absorptiometry), it was found that the primary particles were formed of a spinel crystal structure of $LiMn_{1.45}Ni_{0.45}Fe_{0.05}Ti_{0.05}O_4$.

A positive electrode active material according to Comparative Example 5 was obtained using the same materials and process as those of Comparative Example 2, except that a precursor according to Comparative Example 5 was obtained by dissolving manganese sulfate, nickel sulfate, iron sulfate, and titanium sulfate in water such that a molar ratio Mn:Ni:Fe:Ti of the metal elements was 1.45:0.45:0.05:0.05; and then stirring the solution while adding sodium hydroxide thereto. When primary particles constituting the positive electrode active material were analyzed by X-ray diffraction (Rietveld analysis), ICP emission spectroscopy, and absorptiometry (lanthanum-alizarin complexon absorptiometry), it was found that the primary particles included a spinel phase formed of a spinel crystal structure of $LiMn_{1.45}Ni_{0.45}Fe_{0.05}Ti_{0.05}O_4$ and a layered rock-salt phase formed of a layered rock-salt crystal structure of $Li_2MnO_3$ (hereinafter, the primary particles of the positive electrode active material will also be referred to as "$LiMn_{1.45}Ni_{0.45}Fe_{0.05}Ti_{o0.05}O_4+Li_2MnO_3$"). In addition, it was verified that these phases were present at a molar ratio ($LiMn_{1.45}Ni_{0.45}Fe_{0.05}Ti_{0.05}O_4:Li_2MnO_3$) of 0.95:0.05 (that is, the ratio of $Li_2MnO_3$ was 5 mol % with respect to 100 mol % of the total amount of the positive electrode active material).

A positive electrode active material according to Comparative Example 6 was obtained using the same materials and process as those of Comparative Example 3, except that a precursor according to Comparative Example 6 was obtained by dissolving manganese sulfate, nickel sulfate, iron sulfate, and titanium sulfate in water such that a molar ratio Mn:Ni:Fe:Ti of the metal elements was 1.45:0.45:0.05:0.05; and then stirring the solution while adding sodium hydroxide thereto. When primary particles constituting the positive electrode active material were analyzed by X-ray diffraction (Rietveld analysis), ICP emission spectroscopy, and absorptiometry (lanthanum-alizarin complexon absorptiometry), it was found that the primary particles were formed of a spinel crystal structure of $LiMn_{1.45}Ni_{0.45}Fe_{0.05}Ti_{0.05}O_{3.95}F_{0.05}$.

A positive electrode active material according to Example 2 was obtained using the same materials and process as those of Example 1, except that a precursor according to Example 2 was obtained by dissolving manganese sulfate, nickel sulfate, iron sulfate, and titanium sulfate in water such that a molar ratio Mn:Ni:Fe:Ti of the metal elements was 1.45:0.45:0.05:0.05; and then stirring the solution while adding sodium hydroxide thereto. When primary particles constituting the positive electrode active material were analyzed based on the results obtained by X-ray diffraction (Rietveld analysis), ICP emission spectroscopy, and absorptiometry (lanthanum-alizarin complexon absorptiometry), it was found that the primary particles contained a spinel phase formed of a spinel crystal structure of $LiMn_{1.45}Ni_{0.45}Fe_{0.05}Ti_{0.05}O_{3.95}F_{0.05}$ and a layered rock-salt phase formed of a layered rock-salt crystal structure of $Li_2MnO_{2.96}F_{0.04}$ (hereinafter, the primary particles of the positive electrode active material will also be referred to as "$LiMn_{1.45}Ni_{0.45}Fe_{0.05}Ti_{0.05}O_{3.95}F_{0.05}+Li_2MnO_{2.96}F_{0.04}$").
In addition, it was verified that these phases were present at a molar ratio ($LiMn_{1.45}Ni_{0.45}Fe_{0.05}Ti_{0.05}O_{3.95}F_{0.05}+Li_2MnO_{2.96}F_{0.04}$) of 0.95:0.05 (that is, the ratio of $Li_2MnO_{2.96}F_{0.04}$ was 5 mol % with respect to 100 mol % of the total amount of the positive electrode active material)

The ratios (molar ratios) of the metal elements (Li, Mn, Ni, Fe, Ti) and F added during the preparation of each positive electrode active material of Comparative Examples 1 to 6 and Examples 1 and 2 are shown in the item "Addition Amounts (Molar Ratios) of Positive Electrode Active Material" of Table 1. The average particle size (D50) of each positive electrode active material of Comparative Examples 1 to 6 and Examples 1 and 2 was 10 μm.

such that a mass ratio of the materials was 98:1:1. As a result, a paste-like composition for forming a negative electrode active material layer was prepared. Copper foil (negative electrode current collector) having a thickness of 15 μm was coated with this composition. This coated material was dried and pressed. As a result, a negative electrode sheet in which a negative electrode active material layer was formed on the negative electrode current collector was prepared.

The positive electrode sheet and the negative electrode sheet prepared as above were disposed (laminated) to face each other with a separator sheet (polypropylene-polyethylene porous composite film) interposed therebetween. This laminate and a nonaqueous electrolytic solution were accommodated in a laminate case (laminate film). As a result, a lithium secondary battery according to Comparative Example 1 was prepared. In order to prepare the nonaqueous electrolytic solution, 1 mol/L of $LiPF_6$ was dissolved in a mixed solvent including monofluoromethyl difluoromethyl

TABLE 1

| | Positive Electrode Active Material | Addition Amounts (Molar Ratios) of Positive Electrode Active Material | | | | | | Capacity Decrease Ratio |
|---|---|---|---|---|---|---|---|---|
| | | Li | Mn | Ni | Fe | Ti | F | |
| Comparative Example 1 | $LiMn_{1.5}Ni_{0.5}O_4$ | 1.0 | 1.5 | 0.50 | 0.00 | 0.00 | 0.00 | 100 |
| Comparative Example 2 | $LiMn_{1.5}Ni_{0.5}O_4 + Li_2MnO_3$ | 1.2 | 1.5 | 0.50 | 0.00 | 0.00 | 0.00 | 78 |
| Comparative Example 3 | $LiMn_{1.5}Ni_{0.5}O_{3.95}F_{0.05}$ | 1.0 | 1.5 | 0.50 | 0.00 | 0.00 | 0.05 | 82 |
| Example 1 | $LiMn_{1.5}Ni_{0.5}O_{3.95}F_{0.05} + Li_2MnO_{2.96}F_{0.04}$ | 1.2 | 1.5 | 0.50 | 0.00 | 0.00 | 0.05 | 53 |
| Comparative Example 4 | $LiMn_{1.45}Ni_{0.45}Fe_{0.05}Ti_{0.05}O_4$ | 1.0 | 1.45 | 0.45 | 0.05 | 0.05 | 0.00 | 76 |
| Comparative Example 5 | $LiMn_{1.45}Ni_{0.45}Fe_{0.05}Ti_{0.05}O_4 + Li_2MnO_3$ | 1.2 | 1.45 | 0.45 | 0.05 | 0.05 | 0.00 | 61 |
| Comparative Example 6 | $LiMn_{1.45}Ni_{0.45}Fe_{0.05}Ti_{0.05}O_{3.95}F_{0.05}$ | 1.0 | 1.45 | 0.45 | 0.05 | 0.05 | 0.05 | 52 |
| Example 2 | $LiMn_{1.45}Ni_{0.45}Fe_{0.05}Ti_{0.05}O_{3.95}F_{0.05} + Li_2MnO_{2.96}F_{0.04}$ | 1.2 | 1.45 | 0.45 | 0.05 | 0.05 | 0.05 | 30 |

Using the positive electrode active materials according to Comparative Examples 1 to 6 and Examples 1 and 2 prepared as above, lithium secondary batteries according to Comparative Examples 1 to 6 and Examples 1 and 2 were prepared, respectively. The lithium secondary batteries according to Comparative Examples 1 to 6 and Examples 1 and 2 were prepared using the same materials and process, except that the positive electrode active materials of the respective examples were used.

The positive electrode active material according to any one of Comparative Examples 1 to 6 and Examples 1 and 2, acetylene black as a conductive material, and PVdF as a binder were mixed with each other in N-methyl-2-pyrrolidone (NMP) such that a mass ratio of the materials was 87:10:3. As a result, a slurry-like (paste-like) composition for forming a positive electrode active material layer was prepared. Aluminum foil (positive electrode current collector) having a thickness of 15 μm was coated with this composition. This coated material was dried and pressed. As a result, a positive electrode sheet in which a positive electrode active material layer was formed on the positive electrode current collector was prepared.

Natural graphite having an average particle size of 20 μm as a negative electrode active material, SBR as a binder, and CMC as a thickener were mixed with each other in water carbonate (F-DMC) and monofluoroethylene carbonate (MFEC) at a volume ratio of 1:1.

The lithium secondary battery prepared above according to any one of Comparative Examples 1 to 6 and Examples 1 and 2 was initially charged. That is, the battery was charged to 4.9 V at a constant current of C/5 (charging rate). Next, the battery was charged at a constant voltage until the current value during the charging at the constant voltage reached C/50. As a result, the battery was fully charged (SOC of substantially 100%). Next, under a temperature condition of 25° C., the battery was discharged to 3.5 V at a constant current of C/5. At this time, the discharge capacity (initial capacity) was measured. Here, 1 C refers to a current value at which the battery capacity (Ah) estimated from the theoretical capacity of the positive electrode can be charged in one hour.

After the initial capacity measurement, the lithium secondary battery according to any one of Comparative Examples 1 to 6 and Examples 1 and 2 underwent a charging-discharging cycle test of performing 200 cycles of charging and discharging. After the test, the discharge capacity was measured. In the charging-discharging cycle test, first, under a temperature condition of 60° C., the battery was charged at a constant current at a charging rate of 2 C until the voltage reached 4.9 V. Next, the battery was discharged at a constant current at a discharging rate of 2 C until the voltage reached 3.5 V. This charging and discharging operation was set as one cycle, and 200 cycles were repeated. After the completion of the charging-discharging cycle test, the discharge capacity of the battery after the charging-discharging cycle test (the discharge capacity after 200 cycles) was measured using the same method as that of the initial capacity measurement. A capacity decrease percentage of the discharge capacity after 200 cycles relative to the initial capacity (Initial Capacity−Discharge Capacity after 200 Cycles)/Initial Capacity×100(%)) was calculated. A ratio (capacity decrease ratio) of the capacity decrease percentage of each battery relative to 100 (reference) of the capacity decrease percentage of the lithium secondary battery according to Comparative Example 1 is shown in the item "Capacity Decrease Ratio" of Table 1.

The following results were found from Table 1. The lithium secondary battery according to Example 1 included the positive electrode active material which was formed of the primary particles including the spinel phase and the layered rock-salt phase, in which the spinel phase was formed of a spinel crystal structure of $LiMn_{1.5}Ni_{0.5}O_{3.95}F_{0.05}$, and the layered rock-salt phase was formed of a layered rock-salt crystal structure of $Li_2MnO_{2.96}F_{0.04}$. In this lithium secondary battery according to Example 1, a decrease in capacity was suppressed, that is, durability (cycle characteristics) was improved as compared to the battery according to Comparative Example 1 including the positive electrode active material which was formed of a spinel crystal structure of $LiMn_{1.5}Ni_{0.5}O_4$. In the lithium secondary battery including positive electrode active material according to any of Examples 1 and 2 of the invention, it was found that durability (cycle characteristics) was improved (a decrease in capacity after 200 cycles was suppressed). As described above, the positive electrode active material according to any one of Examples 1 and 2 of the invention was formed of the primary particles including the spinel phase and the layered rock-salt phase. The spinel phase was formed of the Ni—Mn spinel-structure oxide. The layered rock-salt phase was formed of the transition metal composite oxide (layered rock-salt crystal structure oxide) having a layered rock-salt crystal structure which included Li and at least one transition metal element. Both the Ni—Mn spinel-structure oxide and the layered rock-salt crystal structure oxide included oxygen atoms and fluorine atoms.

On the other hand, the following results were also found from Table 1. The lithium secondary battery according to Comparative Example 2 included the positive electrode active material which was formed of the primary particles including the spinel phase and the layered rock-salt phase; however, oxygen atoms in both the Ni—Mn spinel-structure oxide and the layered rock-salt crystal structure oxide were not substituted with fluorine atoms. In the lithium secondary battery according to Comparative Example 3, a part of oxygen atoms in the Ni—Mn spinel-structure oxide was substituted with fluorine atoms; however, the lithium secondary battery according to Comparative Example 3 included the positive electrode active material which was formed of the primary particles including only the spinel phase (that is, without including the layered rock-salt phase). In these lithium secondary batteries according to Comparative Examples 2 and 3, a decrease in capacity was suppressed as compared to the lithium secondary battery according to Comparative Example 1; however, the capacity decrease suppressing effect was lower than that of the battery according to Example 1.

In addition, comparisons were made between the batteries according to Comparative Examples 1 and 4, between the batteries according to Comparative Examples 2 and 5, between the batteries according to Comparative Examples 3 and 6, and between the batteries according to Examples 1 and 2, respectively, in which the respective batteries had the same configuration, except that a part of Ni and Mn in the Ni—Mn spinel-structure oxide constituting the spinel phase was substituted with Ti and Fe. As a result, the following results were found. In the lithium secondary batteries (Comparative Examples 4 to 6 and Example 2) including the positive electrode active material in which a part of Ni and Mn in the Ni—Mn spinel-structure oxide constituting the spinel phase was substituted with Ti and Fe, a decrease in capacity was suppressed as compared to the lithium secondary batteries (Comparative Examples 1 to 3 and Example 1) including positive electrode active material with the spinel phase in which the Fe substitution and the Ti substitution were not performed. In particular, the lithium secondary battery according to Example 2 included the positive electrode active material which was formed of the primary particles including the phase, which was formed of a spinel crystal structure of $LiNi_{0.45}Fe_{0.05}Mn_{1.45}Ti_{0.05}O_{3.95}F_{0.05}$, and the phase which was formed of a layered rock-salt crystal structure of $Li_2MnO_{2.96}F_{0.04}$. In the lithium secondary battery according to Example 2, a decrease in capacity was suppressed, that is, durability (cycle characteristics) was improved as compared to the batteries according to Comparative Examples 4 to 6.

Hereinabove, specific examples of the invention have been described in detail. However, these examples are merely exemplary and do not limit the invention. The invention includes various modifications and alternations of the above specific examples.

What is claimed is:

1. A positive electrode active material for a lithium secondary battery, the positive electrode active material comprising
a primary particle including a spinel phase and a layered rock-salt phase, wherein
the spinel phase is formed of a nickel-and-manganese-containing composite oxide having a spinel crystal structure that includes lithium, nickel, and manganese,
the layered rock-salt phase is formed of a transition metal composite oxide having a layered rock-salt crystal structure that includes lithium and at least one transition metal element,
the nickel-and-manganese-containing composite oxide contains oxygen and fluorine, and
the transition metal composite oxide includes oxygen and fluorine,
wherein the transition metal composite oxide is represented by the following Formula (II):

$$Li_{(2-a)}M1_{(1+a)}O_{3-b}F_b \qquad (II)$$

where M1 represents manganese or at least two elements including manganese, and
a and b satisfy the following relationships:

$$0 < b \le 1; \text{ and}$$

$$0 \le a \le 0.5.$$

2. The positive electrode active material for a lithium secondary battery according to claim 1, wherein
the fluorine constituting the nickel-and-manganese-containing composite oxide is fluorine substituted with a part of the oxygen constituting the nickel-and-manganese-containing composite oxide, and
the fluorine constituting the transition metal composite oxide is fluorine substituted with a part of the oxygen constituting the transition metal composite oxide.

3. The positive electrode active material for a lithium secondary battery according to claim 1, wherein
the nickel-and-manganese-containing composite oxide is represented by the following Formula (I):

$$LiMn_{2-x-y}Ni_xM_yO_{4-z}F_z \quad (I)$$

where M represents at least one element selected from the group consisting of Fe, Ti, Al, Si, Mg, Ca, Ba, Sr, Sc, V, Cr, Co, Cu, Zn, Ga, Y, Ru, Rh, Pd, In, Sn, Sb, La, Ce, Sm, Zr, Nb, Ta, Mo, W, B, C, P, and S, and
x, y, and z satisfy the following relationships:

$0 < z \le 1;$ $0.4 \le x \le 0.6;$ and $0 < y \le 0.6.$

4. The positive electrode active material for a lithium secondary battery according to claim 3, wherein
M represents two or more elements selected from the group consisting of Fe, Ti, Al, Si, Mg, Ca, Ba, Sr, Sc, V, Cr, Co, Cu, Zn, Ga, Y, Ru, Rh, Pd, In, Sn, Sb, La, Ce, Sm, Zr, Nb, Ta, Mo, W, B, C, P, and S.

5. The positive electrode active material for a lithium secondary battery according to claim 4, wherein
the nickel-and-manganese-containing composite oxide is represented by the following Formula (IA):

$$LiMn_{2-x-y}Ni_xFe_vTi_wO_{4-z}F_z \quad (IA)$$

where v and w satisfy the following relationships:

$0 < v < 0.6;$ $0 < w < 0.6;$ and $v + w = y.$

6. The positive electrode active material for a lithium secondary battery according to claim 3, wherein
the nickel-and-manganese-containing composite oxide contains at least one of Fe and Ti as M.

7. The positive electrode active material for a lithium secondary battery according to claim 1, wherein
the primary particle of the nickel-and-manganese-containing composite oxide has no grain boundary.

8. The positive electrode active material for a lithium secondary battery according to claim 1, wherein
a ratio of the transition metal composite oxide is 3 mol % to 8 mol % with respect to 100 mol % of a total amount of the transition metal composite oxide and the nickel-and-manganese-containing composite oxide.

9. A positive electrode for a lithium secondary battery, the positive electrode comprising
a positive electrode active material layer that is provided on a positive electrode current collector and includes the positive electrode active material according to claim 1.

10. A lithium secondary battery comprising:
a positive electrode that includes a positive electrode active material layer provided on a positive electrode current collector;
a negative electrode that includes a negative electrode active material layer provided on a negative electrode current collector; and
a nonaqueous electrolyte, wherein
the positive electrode active material layer includes the positive electrode active material according to claim 1.

* * * * *